(12) United States Patent
Ruehmann et al.

(10) Patent No.: US 10,975,681 B2
(45) Date of Patent: Apr. 13, 2021

(54) APPARATUS AND METHOD FOR LOCATING TOOL JOINT

(71) Applicant: Weatherford Technology Holdings, LLC, Houston, TX (US)

(72) Inventors: Rainer Ruehmann, Hannover (DE); Andreas Bruening, Burgwedel (DE)

(73) Assignee: WEATHERFORD TECHNOLOGY HOLDINGS, LLC, Houston, TX (US)

( * ) Notice: Subject to any disclaimer, the term of this patent is extended or adjusted under 35 U.S.C. 154(b) by 57 days.

(21) Appl. No.: 16/379,142

(22) Filed: Apr. 9, 2019

(65) Prior Publication Data

US 2020/0325764 A1 Oct. 15, 2020

(51) Int. Cl.
| | | |
|---|---|---|
| *E21B 47/002* | (2012.01) | |
| *E21B 47/00* | (2012.01) | |
| *G06T 7/73* | (2017.01) | |
| *G06T 7/13* | (2017.01) | |
| *E21B 19/16* | (2006.01) | |
| *G06K 9/34* | (2006.01) | |
| *G06K 9/68* | (2006.01) | |
| *G06T 7/00* | (2017.01) | |

(52) U.S. Cl.
CPC ............ *E21B 47/00* (2013.01); *E21B 19/161* (2013.01); *G06K 9/342* (2013.01); *G06K 9/685* (2013.01); *G06T 7/001* (2013.01); *G06T 7/13* (2017.01); *G06T 7/74* (2017.01); *G06K 2209/19* (2013.01); *G06T 2207/10004* (2013.01); *G06T 2207/20132* (2013.01); *G06T 2207/30108* (2013.01)

(58) Field of Classification Search
CPC ........ E21B 47/002; E21B 19/161; G06T 7/74
See application file for complete search history.

(56) References Cited

U.S. PATENT DOCUMENTS

| | | | | |
|---|---|---|---|---|
| 5,107,705 | A | * 4/1992 | Wraight | .................. E21B 45/00 73/152.03 |
| 6,752,044 | B2 | 6/2004 | Hawkins, III | |
| 6,965,230 | B2 | 11/2005 | Rogers et al. | |
| 7,815,093 | B2 | 10/2010 | Hees | |
| 8,065,937 | B2 | 11/2011 | Halse | |
| 9,322,950 | B2 | * 4/2016 | Gustavsson | .............. G01V 8/10 |
| 9,464,492 | B2 | * 10/2016 | Austefjord | ............ B66C 13/085 |

(Continued)

FOREIGN PATENT DOCUMENTS

| | | |
|---|---|---|
| EP | 2458135 A2 | 5/2012 |
| EP | 2666955 A2 | 11/2013 |

(Continued)

OTHER PUBLICATIONS

International Search Report and Written Opinion in related matter PCT/US2020/027085 dated Aug. 24, 2020.

*Primary Examiner* — Catherine Loikith
(74) *Attorney, Agent, or Firm* — Patterson + Sheridan, LLP

(57) ABSTRACT

Embodiments relate to apparatus and methods for locating a tubular joint using two dimensional images. A tubular feature may be located by capturing a first two dimensional image of a tubular, capturing a second two dimensional image of the tubular including a reference, identifying a tubular joint or stick-up of the tubular from the first or second two dimensional image, and determining a vertical position of the tubular joint or stick-up of the tubular using the reference.

22 Claims, 18 Drawing Sheets

(56) References Cited

U.S. PATENT DOCUMENTS

| | | | |
|---|---|---|---|
| 2004/0223533 A1* | 11/2004 | Dishaw | G01J 5/0022 |
| | | | 374/4 |
| 2008/0282847 A1 | 11/2008 | Halse | |
| 2008/0307930 A1 | 12/2008 | Veverica et al. | |
| 2010/0326659 A1 | 12/2010 | Schultz et al. | |
| 2011/0315261 A1* | 12/2011 | Coleman | E21B 17/006 |
| | | | 138/104 |
| 2012/0026322 A1 | 2/2012 | Malka et al. | |
| 2013/0008644 A1 | 1/2013 | Huseman et al. | |
| 2013/0271576 A1 | 10/2013 | Ellis | |
| 2015/0204182 A1 | 7/2015 | Andarawis et al. | |
| 2016/0194950 A1 | 7/2016 | Zheng et al. | |
| 2016/0312602 A1 | 10/2016 | Carlson et al. | |
| 2017/0081954 A1 | 3/2017 | Dewald et al. | |
| 2017/0314369 A1 | 11/2017 | Rosano et al. | |
| 2018/0016854 A1* | 1/2018 | Rogers | G01V 3/28 |
| 2019/0119996 A1* | 4/2019 | Ly | E21B 47/12 |
| 2020/0149360 A1* | 5/2020 | Traaserud | E21B 47/002 |

FOREIGN PATENT DOCUMENTS

| | | |
|---|---|---|
| WO | 2007061345 A1 | 5/2007 |
| WO | 2016100693 A1 | 6/2016 |

* cited by examiner

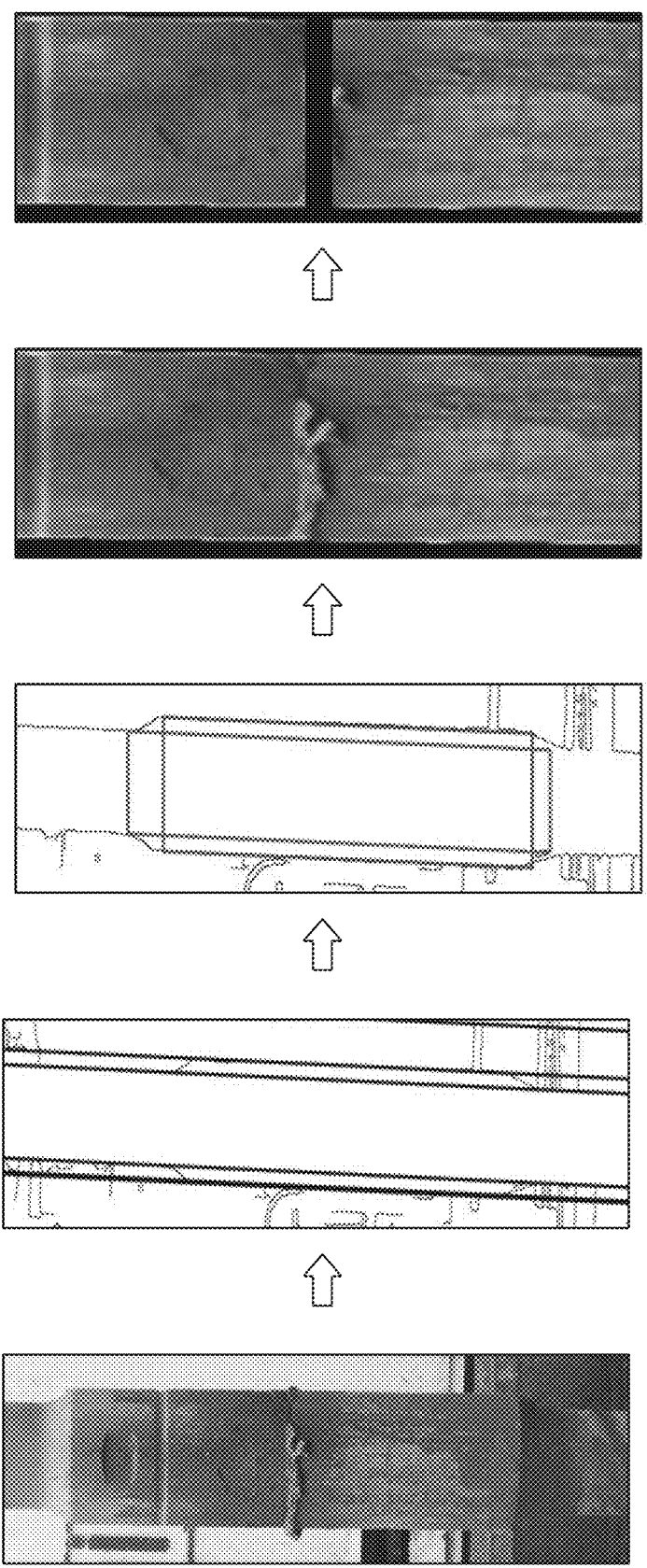

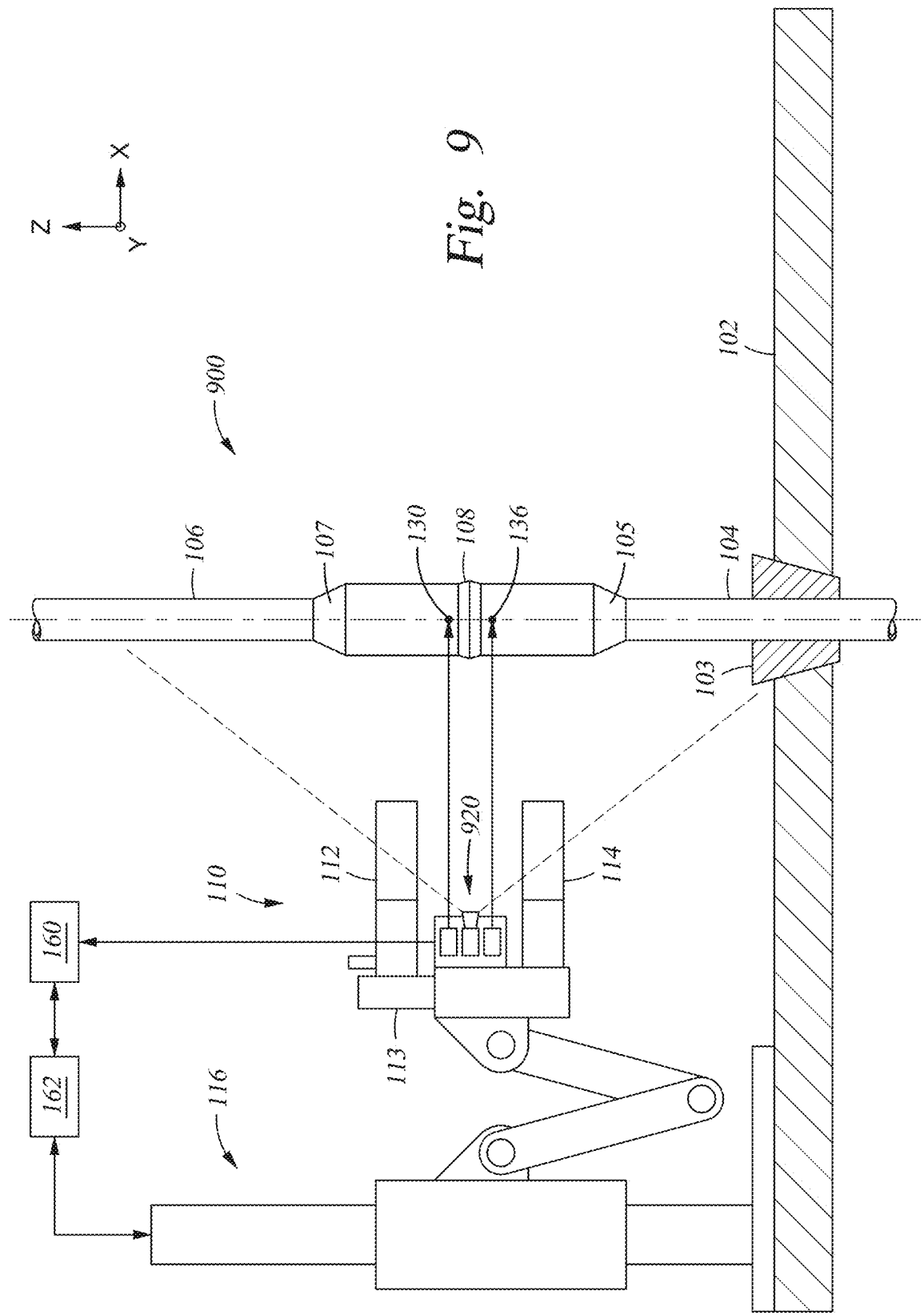

APPARATUS AND METHOD FOR LOCATING TOOL JOINT

BACKGROUND OF THE DISCLOSURE

Field of the Disclosure

The present disclosure generally relates to a method for autonomous making up and evaluating threaded connections.

Description of the Related Art

Construction of oil or gas wells usually requires making long tubular strings that make up casing, risers, drill pipe or other tubing. Due to the length of these strings, sections or stands of tubulars are progressively added to or removed from the tubular strings as they are lowered or raised from a drilling platform.

A tong assembly is commonly used to make up or break out joints in the tubular strings. A tong assembly typically includes a power tong and a backup tong connected. During operation, the power tong grasps a first tubular while the backup tong grasps a second tubular, the power tong rotates relative to the backup tong to make up a joint between the first and second tubulars or break out the joint between the first and second tubulars. Prior to the makeup or break out operation, the power tong and backup tong are aligned with the first and second tubular so that the power tong and the backup tong are positioned on opposite sides of the joint.

Conventionally, alignment between the tong assembly and the tubulars is performed manually where the tong assembly is moved to the alignment position by human operators manually controlling the tong assembly. Manual operation is time consuming, expensive, and susceptible to human errors.

Therefore, there is a need for apparatus and methods for automatically aligning a tong assembly with tubulars to be operated to improve efficiency, lower costs, and increase reliability.

SUMMARY OF THE DISCLOSURE

Embodiments of the present disclosure relate to apparatus and methods for automatically aligning a tong assembly with tubulars to be operated.

Embodiments of the present disclosure provide a method for locating a tubular feature. In some embodiments, the method comprises capturing a first two dimensional image of a tubular, capturing a second two dimensional image of the tubular including a reference, identifying a tubular joint or stick-up of the tubular from the first or second two dimensional image, and determining a vertical position of the tubular joint or stick-up of the tubular using the reference.

Some embodiments of the present disclosure provide a method of locating a tubular joint. The method includes capturing a two dimensional image including a tubular segment wherein a first tubular is connected to a second tubular by a tubular joint, identifying edges of the tubular segment from the two dimensional image, identifying a first feature in the first tubular and a second feature in the second tubular; defining a region of interest in the two dimensional image, wherein the region of interest is defined between the edges of the tubular segment and between the first feature and the second feature, and identifying the tubular joint within the region of interest.

Embodiments of the present disclosure provide a system for locating a tubular joint on a rig floor. The system includes a first laser positioned to project a first marker onto a tubular structure, a second laser positioned to project a second marker onto the tubular structure, wherein a distance between the first marker and the second marker is known, a camera positioned to capture two dimensional images of the tubular structure of a region including the first and second markers, and a controller connected to the first laser, second laser, and the camera.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIGS. 3A-3E schematically demonstrate an example of locating a tubular joint using two dimensional images according to embodiments of the present disclosure.

FIG. 9 is a schematic side view of a tubular handling system according to embodiments of the present disclosure.

DETAILED DESCRIPTION

Embodiments of the present disclosure relate to apparatus and methods for aligning a tong assembly with a tubular for a makeup or break out operation. More particularly, embodiments of the present disclosure relate to aligning a tong assembly with a tubular using two dimensional images. The apparatus and methods may be used to perform tubular makeup and/or break out operations in various situations, such as making or breaking a tubular string on a rig for oil and gas exploration and production.

Figure 1A:
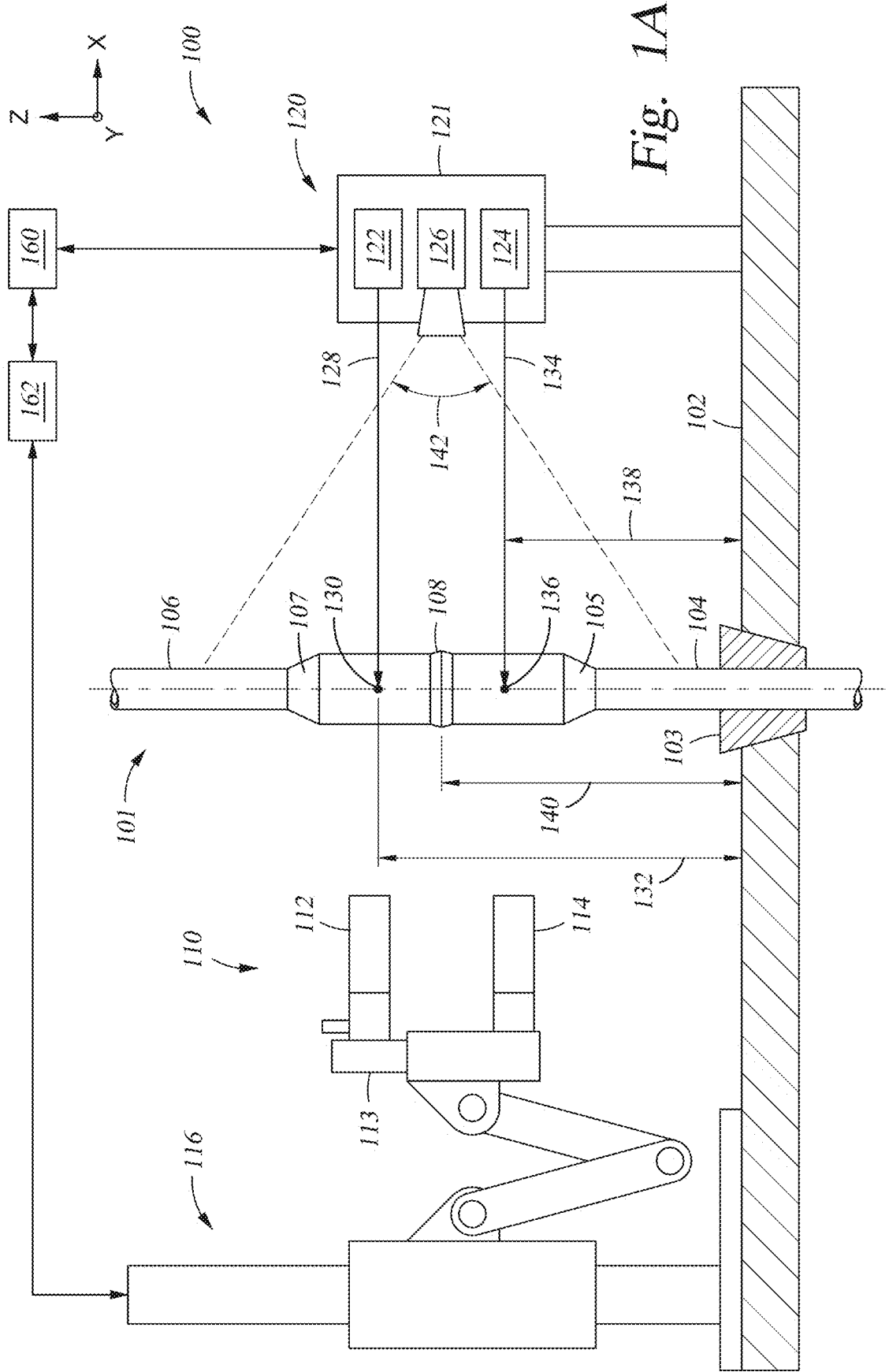
FIG. 1A is a schematic side view of a tubular handling system according to embodiments of the present disclosure.

FIG. 1A is a schematic side view of a tubular handling system 100 according to embodiments of the present disclosure. The tubular handling system 100 includes a tong assembly 110, an imaging unit 120, and a controller 160 connected to the imaging unit 120 and the tong assembly 110.

In the embodiment of FIG. 1A, the tong assembly 110 and the imaging unit 120 are positioned on a rig floor 102. The tong assembly 110 is configured to make up and break out a tubular string 101 for operations on the rig floor 102. The tubular string 101 may be a drilling string, a production string, a casing string, or other strings that is made up tubular elements connected by threaded connections. In FIG. 1A, the tubular string 101 rests on a spider 103 on the rig floor 101 while a first tubular 104 is sticking out over the rig floor 102. The first tubular 104 is connected to a second tubular 106 by a tubular joint 108.

The tong assembly 110 includes a power tong 112 and a backup tong 114. The power tong 112 and backup tong 114 are connected to a frame 113. During operation, the power tong 112 and the backup tong 114 grasp to two tubulars respectively and rotate relative to each other to makeup a tubular joint between the two tubulars or break out a tubular joint between the two tubulars. A tong handler 116 moves the tong assembly 110 over the rig floor 102 to align the tong assembly 110 with tubulars during operation. The tong handler 116 may be a robotic arm, a forklift, or other equipment to move the tong assembly 110 horizontally and vertically on the rig floor 102.

In some embodiments, the tong assembly 110 includes a tong controller 162. The controller 162 is configured to control movements of the power tong 112, the backup tong 114 and the tong handler 116 during operation. In some embodiments, the controller 162 includes a computer or a programmable logical controller (PLC) having program operable to detect position and control movements of the power tong 112, the backup tong 114 and the tong handler 116. The controller 162 may be a standalone controller, a module integrated in a system controller, or a built-in module of the tong assembly 110.

The imaging unit 120 may include two laser pointers 122, 124, and a camera 126. The two laser pointers 122, 124 are positioned to project laser beams 128, 134 respectively towards the tubular string 101 on the rig floor 102. In some embodiments, the laser pointers 122, 124 project two laser marks 130, 136 respectively on the tubular string 101. The marks 130, 136 may be dots, lines, or other shapes.

In some embodiment, locations of the marks 130, 136 are fixed and known. For example, a height 132 of the mark 130 from the rig floor 102 is fixed and known and a height 138 of the mark 136 from the rig floor 102 is also fixed and known. Thus, a distance between the marks 130, 136 is also known and fixed. As discussed below, a height 140 of the tubular joint 108 can be determined according to the relative position of the tubular joint 108 and the marks 130, 136 in a two dimensional image captured by the camera 126.

In some embodiments, each of the laser pointers 122, 124 includes a single laser configured to project laser marks of a single color. The laser pointers 122, 124 may include a single laser of the same color. In other embodiments, each of the laser pointers 122, 124 includes two or more lasers of different colors. Each laser pointer 122, 124 is configured to project laser marks of two or more colors. For example, each mark 130, 136 may include two or more points or lines that are apart from each other, and each point and line having a different color. The marks 130, 136 are of the same pattern so that points/lines of the same color in the marks 130, 136 are positioned at a known distance.

The camera 126 may be any type of cameras that are capable of taking two dimensional images. In some embodiments, the camera 126 is a color camera configured to capture color images. In some embodiments, the camera 126 is a gray-scale camera configured to capture gray-scale images. In some embodiments, the camera 126 is configured to take two dimensional still images. The camera 126 is positioned to capture images including the tubular string 101. Particularly, the camera 126 is positioned such that a segment of the tubular string 101 including the tubular joint 108 is within a vertical field of view 142 of the camera 126.

In some embodiments, the imaging unit 120 includes a housing 121. The laser pointers 124, 122 and the camera 126 are positioned together in the housing 121. In other embodiments, the laser pointers 124, 122 and the camera 126 are located at different locations.

In some embodiments, the imaging unit 120 is stationary during operation, such as fixedly positioned on the rig floor 102 or other stationary equipment on the rig floor 102. In other embodiments, all or portion of the imaging unit 120 are movable during operation. For example, the imaging unit 120 may be positioned on the tong assembly 110.

Figure 1B:
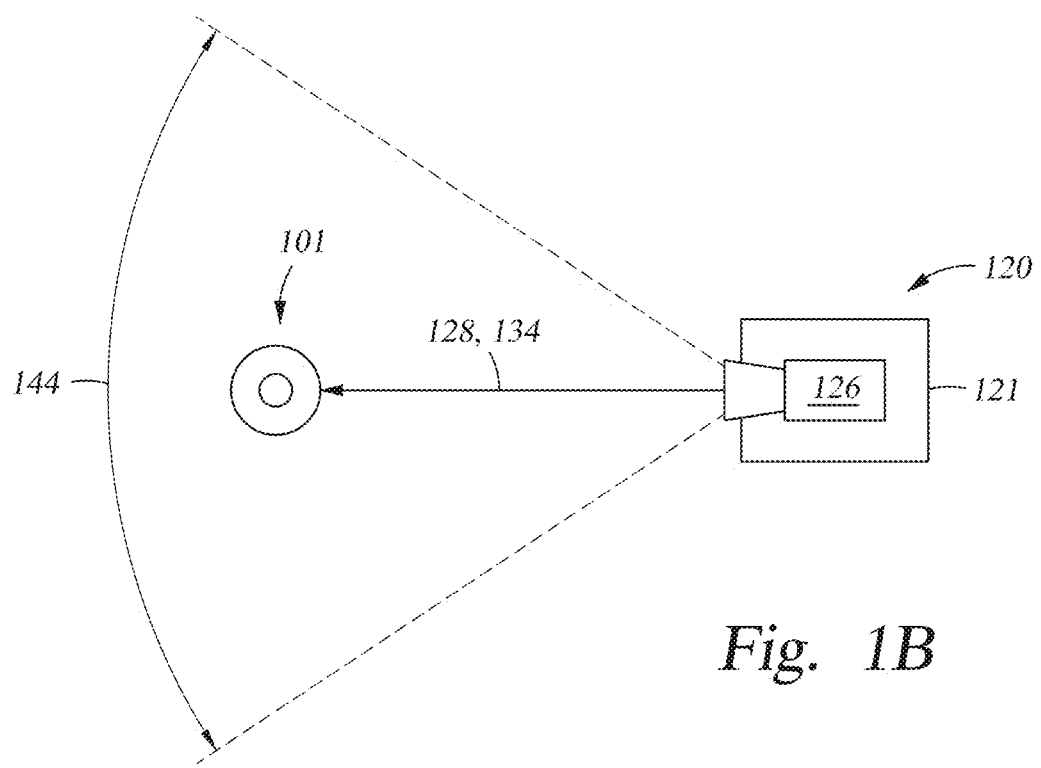
FIG. 1B is a schematic top view showing a tubular relative to a horizontal field of view of a camera in the tubular handling system of FIG. 1A.

FIG. 1B is a schematic top view showing the tubular string 101 relative to a horizontal field of view 144 of the camera 126. The camera 126 may be positioned so that the tubular string 101 is at a central region of the images captured by the camera 126. In some embodiments, the camera 126 is positioned at a location so that the tubular string 101 appears near a central region of images captured by the camera 126 and a longitudinal axis of the tubular string 101 is substantially vertical in the images.

Figure 1C:
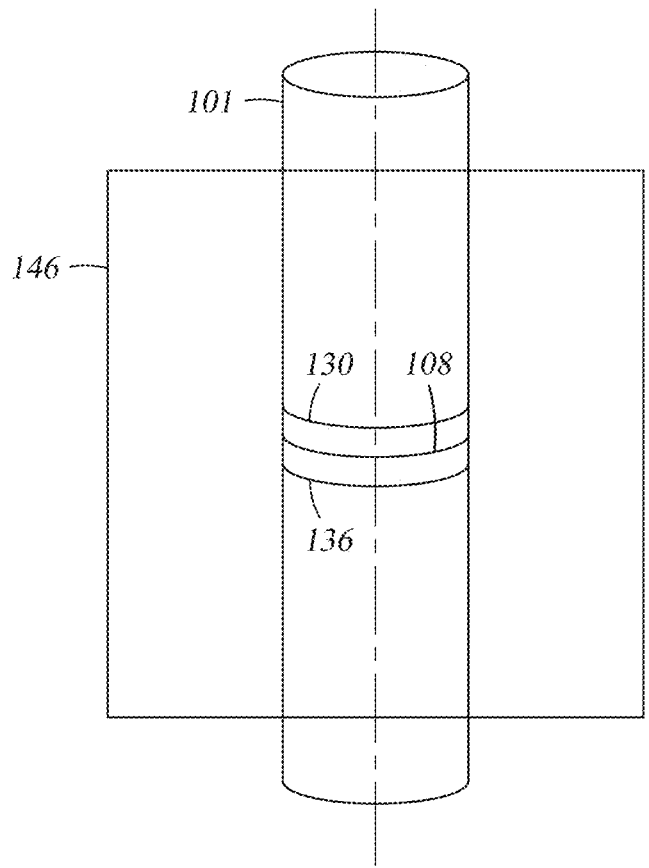
FIG. 1C schematically demonstrates a frame of a two dimensional image for joint locating according to embodiments of the present disclosure.

FIG. 1C schematically demonstrates a two dimensional image 146 taken by the camera 126 according to some embodiments. A portion of the tubular string 101 including the tubular joint 108 and the marks 130, 136 is captured in the image 146. In the image 146, the tubular string 101 is substantially vertically positioned near the center. In FIG. 1C, the marks 130, 136 are shown as lines. Alternatively, the marks 130, 136 can be dots, or other shapes. Even though the marks 130, 136 are positioned on opposite sides of the tubular joint 108 in the image 146, both of the marks 130, 136 may be positioned above or below the tubular joint 108.

Returning to FIG. 1A, the tubular handling system 100 further includes a controller 160. The controller 160 is connected to the tong controller 162 and the imaging unit 120. The controller 160 and the tong controller 162 may be connected via wired or wireless communication. The controller 160 and the tong controller 162 may communicate through local area network (LAN), or wide area network (WAN). The controller 160 is configured to identify the tubular joint 108 from the images captured by the camera 126 and determine a vertical position of the tubular joint 108 using the marks 130, 136. The location position of the tubular joint 108 may be in the form of a height 140 of the tubular joint 108 from the rig floor 102. The controller 160 communicates with the tong controller 162 to provide location of the tubular joint 108. The tong controller 162 further controls the tong handler 116 to move the tong 110 according to the determined vertical position of the tubular joint 108.

In some embodiments, the controller 160 includes a computer or a programmable logical controller (PLC) having program operable to identify a tubular joint in two dimensional images, determine vertical location of the tubular joint using laser marks, and control movement of a tong assembly. The controller 160 may be a stand-alone controller, a module integrated in a system controller of a tubular handling system, or a built-in module with the imaging unit 120.

Figure 1D:
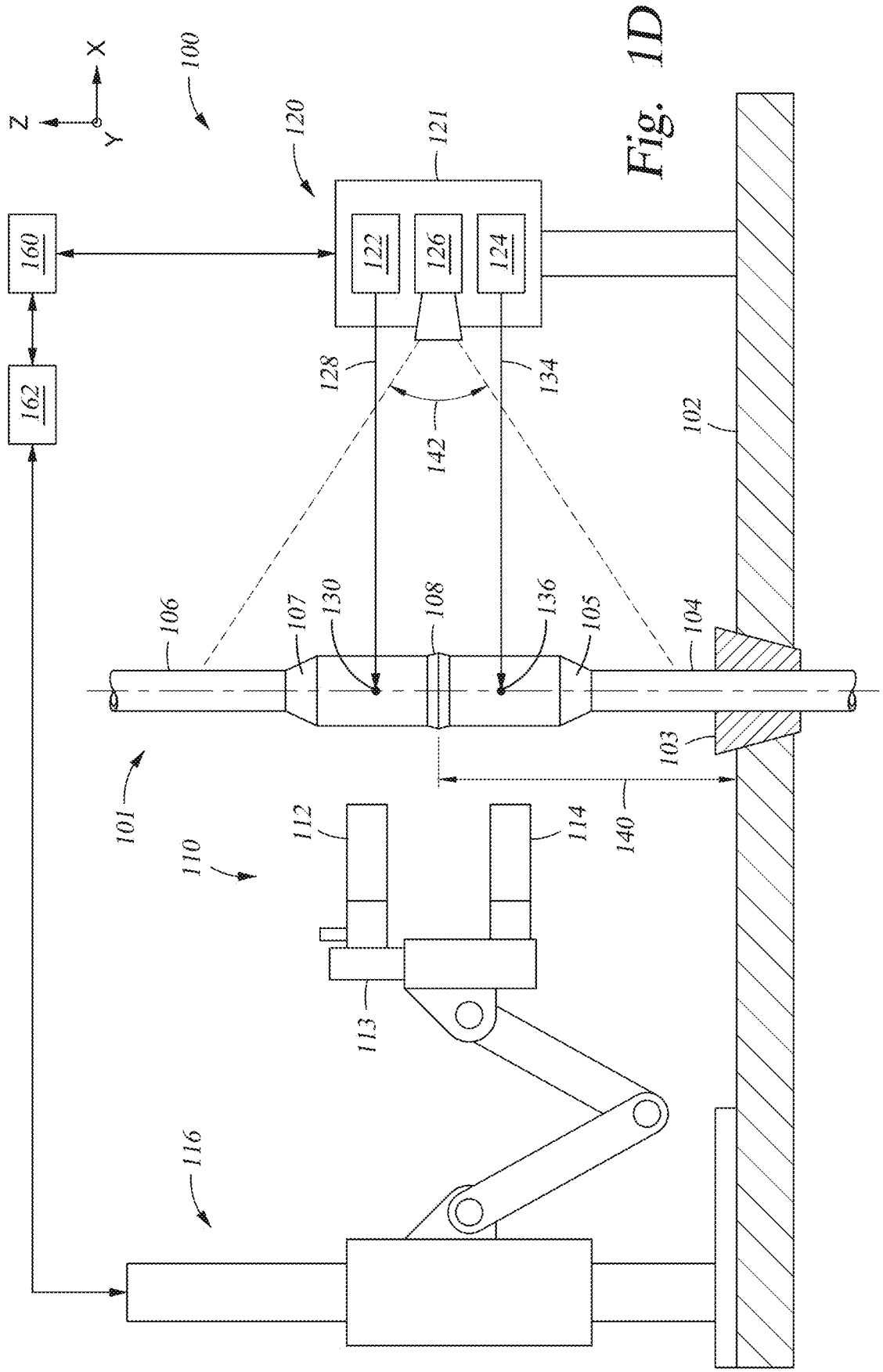
FIG. 1D schematically illustrates aligning a tong assembly with a tubular joint to break out the tubular joint using methods according embodiments of the present disclosure.
Figure 1E:
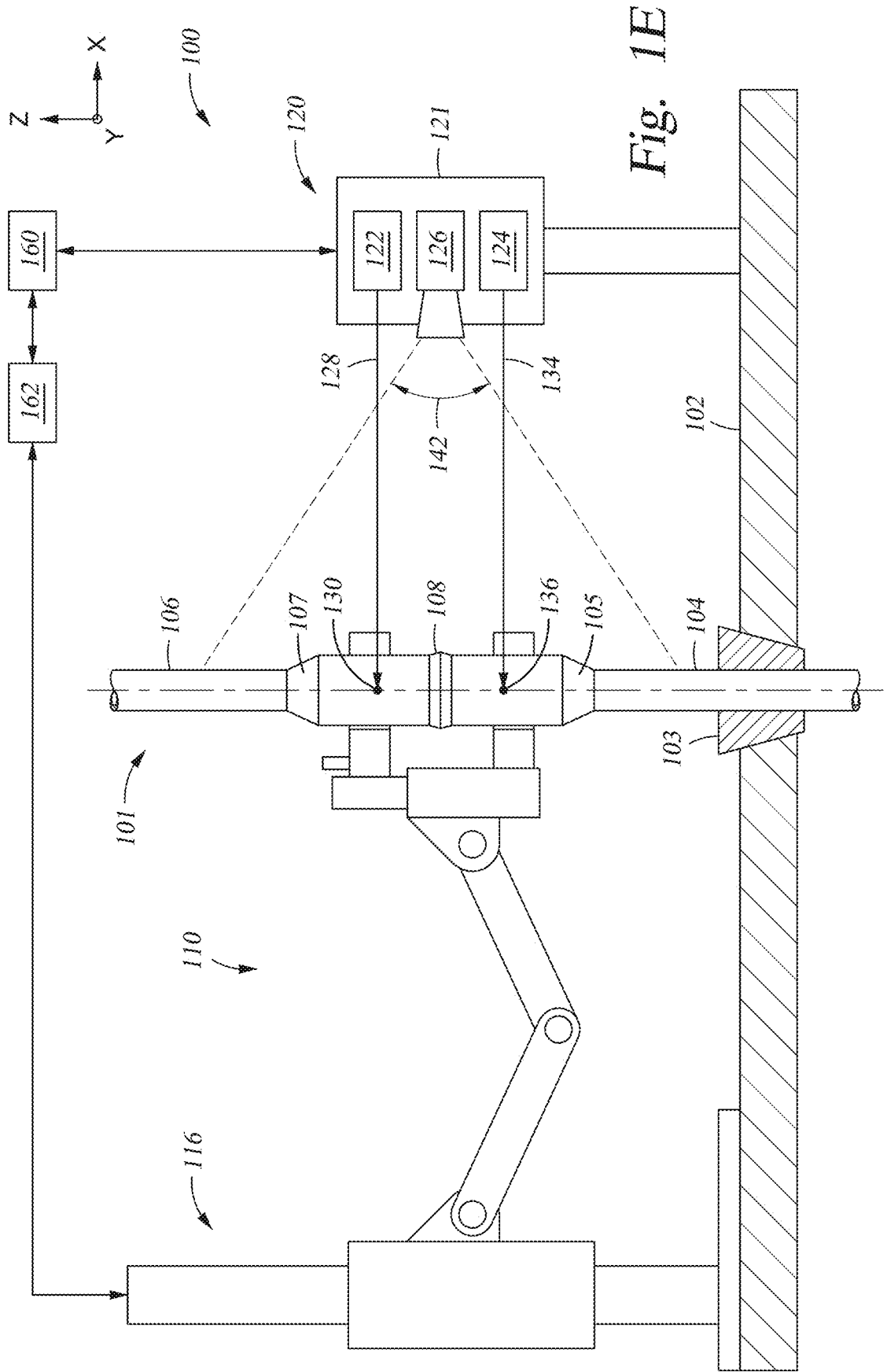
FIG. 1E schematically illustrates breaking out a tubular joint using the tubular handling system of FIG. 1A.

FIGS. 1A, 1D, 1E schematically demonstrate an operation for breaking out a tubular joint using the tubular handling system 100. In FIG. 1A, the imaging unit 120 captures images of the section of the tubular string 101 including the tubular joint 108.

In some embodiments, the controller 160 communicates to the tong controller 162 position of the tubular joint 108. The tong controller 162 operates a computer program to align the tong assembly 110 with the tubular joint 108 prior to performing the breaking out operation. In some embodiments, the imaging unit 120 takes two images of the tubular string 101: a first image is taken while the laser pointers 122, 124 are projecting marks 130, 136 onto the tubular string 101, and a second image is taken while the laser pointer 122, 124 are off. By comparing the first and second images, for example using image processing program in the controller 160, positions of the marks 130, 136 in the images can be identified. In some embodiments, the first or second image is analyzed to identify the tubular joint 108 in the image. The location, including a height, of the tubular joint 108 is then determined using positions of the marks 130, 136 as reference.

Upon determining the height of the tubular joint 108, the controller 160 sends commands to the tong controller 162 and the tong handler 116 to align the tong assembly 110 with the tubular joint 108 for a breaking out operation. In some embodiments, when the height of the tubular joint 108 is not detected, the controller 160 returns an error message. FIG. 1D schematically illustrates an intermediate step of aligning the tong assembly 110 with the tubular joint 108 to break out the tubular joint 108. The tong assembly 110 is positioned at a height to have the power tong 112 and the backup tong 114 at opposite sides of the tubular joint 108 so that the power tong 112 and the backup tong 114 can each grasp a tubular. FIG. 1E schematically illustrates that the tong assembly 110 grasping the tubulars 106, 104 to break out the tubular joint 108.

Figure 2:
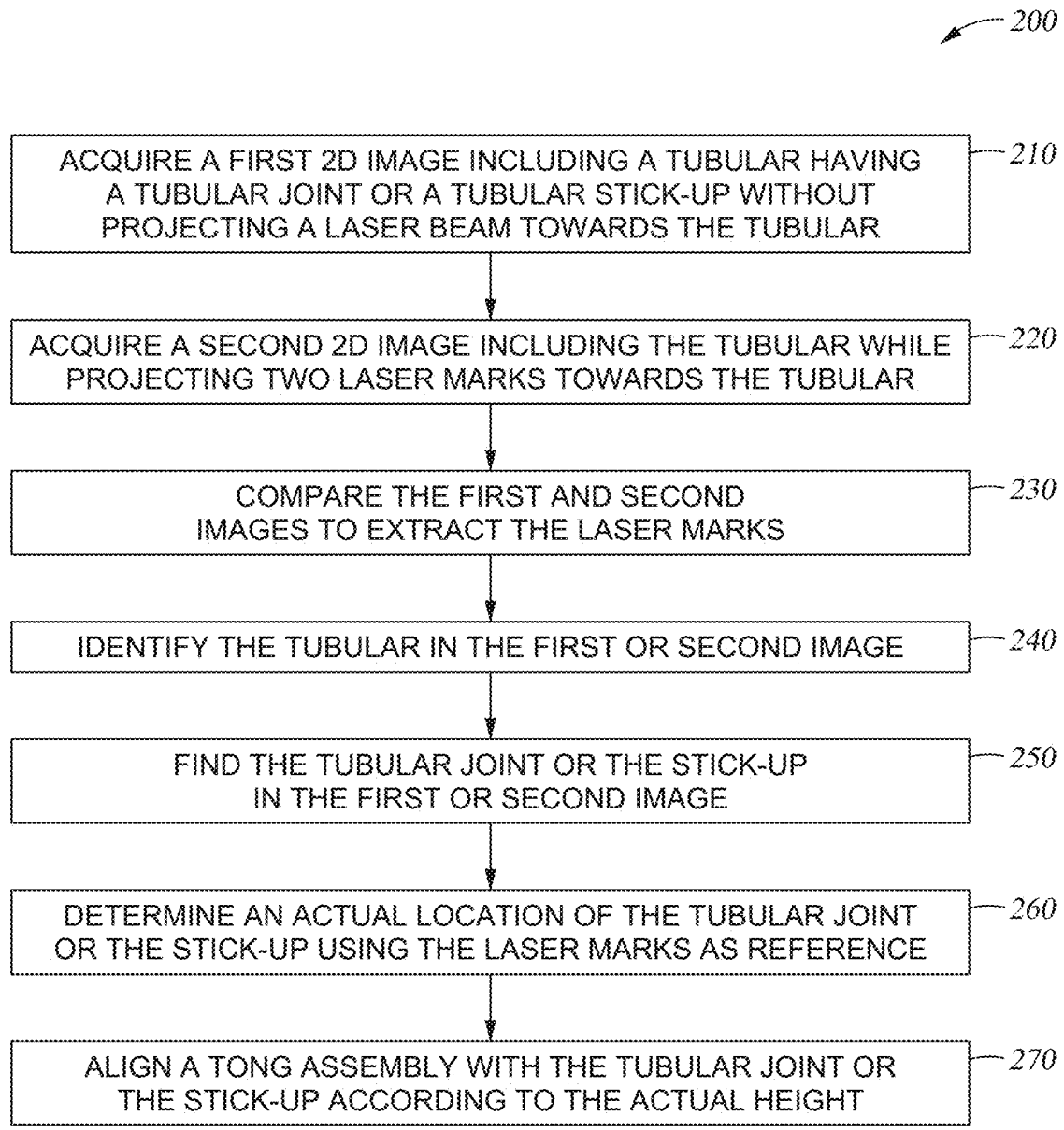
FIG. 2 is a flow chart of a method for aligning a tong assembly with a tubular joint according to embodiments of the present disclosure.

FIG. 2 is a flow chart of a method 200 for aligning a tong assembly with a tubular joint according to embodiments of the present disclosure.

The method 200 may be performed by the tubular handling system 100. For example, the method 200 may be performed in the controller 160 using the imaging unit 120 and the tong handler 116. The method 200 can be used to determining a location of a tubular joint for a breakout operation or to determining a location of a tubular stick-up for a makeup operation.

In operation 210, a first 2D image including a tubular having a tubular joint or a tubular stick-up is captured without projecting any laser beams towards the tubular. For example, in the tubular handling system 100, the imaging unit 120 may be used to take the first 2D image using the camera 126. The camera 126 is positioned to capture images of a tubular section that includes the tubular joint 108 for a break out operation or a tubular stick-up for a makeup operation. In operation 210, the laser pointers 122, 124 are set on an off position so there are no laser marks on the tubular 101.

In operation 220, a second 2D image including the tubular having the tubular joint or the tubular stick-up is captured while projecting laser beams towards the tubular. The second 2D image is substantially similar to the first 2D images except for the presence of the laser marks on the tubular. For example, in the tubular handling system 100, the imaging unit 120 may be used to take the second 2D image using the camera 126. In operation 220, the laser pointers 122, 124 are set to project two laser marks on the tubular 101. The two laser marks are located at two different positions on the tubular. Both positions of the laser marks are preset. In some embodiments, the two laser marks are set at different heights, and are used to determine an actual height of the tubular joint or tubular stick-up. It should be noted that operation 220 can be performed before operation 210.

In operation 230, locations of the laser marks, such as the laser marks 130, 138 in the second 2D image can be identified by comparing the first and second 2D images. The laser marks can be used as reference points to determine the actual location of the tubular joint or tubular stick-up.

In operation 240, the tubular in the first or second 2D image is identified using an image processing program operating in a controller, such as the controller 160. The tubular can be identified using algorithms and methods of imaging processing algorithm. In some embodiments, identifying the tubular in the 2D image including detecting parallel lines along a vertical direction. One exemplary method is described in FIG. 4A below.

In some embodiments, after identifying the tubular, the 2D image is cropped to remove portions outside the tubular. By cropping the 2D images, the region of interest for subsequent analysis is reduced, thus, improves process efficiency of the subsequent analysis.

In some embodiments, the 2D image is further cropped to reduce an area of interest prior to the identifying the tubular joint or tubular stick-up. For example, shoulder features on the tubular may be first identified to crop the image and reduce region of interest for further analysis. Tubulars used in oil and gas fields usually have a shoulder feature near each end. For example, the tubular 104 in FIG. 1A includes a shoulder feature 105 and the tubular 106 includes a shoulder feature 107. The tubular joint 108 is located between the shoulder features 105, 107. When the shoulder features 105 and 107 are identified in the image, the image can be further cropped and analysis of the image is limited to the area of the tubular portion between the shoulder features 105, 107. This cropping of the image further reduces of region of interest in the image for the analysis, thus, reducing computation time and improving efficiency.

In operation 250, the tubular joint or tubular stick-up is identified in the 2D image using image processing techniques. In some embodiments, the tubular joint or tubular stick-up is identified by detecting horizontal lines intersecting the parallel lines, identified in operation 240, to define the tubular. In some embodiments, operation 250 is performed over the cropped 2D image resulting from operation 240.

In operation 260, an actual location of the identified tubular joint or tubular stick-up is determined using the laser marks as reference. As discussed in operation 220, actual positions of the laser marks on the tubular are preset and known to the system. After the tubular joint or the tubular stick-up is identified in the 2D image, actual location of the tubular joint/stick up can be determined using relative position between the identified tubular joint/stick-up and the laser marks in the 2D image. In some embodiments, the actual height of the tubular joint/stick-up is determined using locations of the two laser marks having different actual heights.

When detection of the location of the identified tubular joint fails, operation 260 returns an error message. Upon returning an error message, the tong assembly may be set to manual mode, and the tong assembly may be aligned with the tubular joint manually.

In operation 270, a tong assembly is aligned with the tubular string according to the determined location of the tubular joint/stick-up to perform a break out/make up operation. For example, in the tubular handling system 100, the controller 160 may send the commands to the tong handler 116 to align the tong assembly 110 with the tubular string 101 according to the actual height of the tubular joint 108, which is determined in operations 210-260.

FIGS. 3A-3E schematically demonstrate an example of locating a tubular joint using two dimensional images according to embodiments of the present disclosure. FIG. 3A is an example of the second 2D image as described in operation 220 of the method 200. The 2D image is a color image including a section of the tubular string. Two laser marks in red color are projected on the tubular string and captured in the 2D image.

FIGS. 3B-3D are exemplary intermediate images during identifying the tubular in operation 240. In FIG. 3B, the original color image is converted to a black and white image, image processing operations are performed to detect parallel lines corresponding to boundaries of the tubular. A method for detecting tubular is described below with FIGS. 4A-4E. In FIG. 3B, the image is cropped to limit the region of interest according to the parallel lines corresponding to the tubular.

In FIG. 3C, shoulder features of the tubular are identified. Methods for detecting shoulder features are described below with FIGS. 5A-5D and FIGS. 6A-6D. In FIG. 3D, the region of interest in the 2D image is further limited according to the identified shoulder features.

FIG. 3E is an image showing the tubular joint is identified within the region of interest as in operation 250. In FIG. 3E, the image in the region of interest is analyzed to identify the tubular joint. Image processing operations are performed in the region of interest to detect horizontal features corresponding to the tubular joint. A method for detecting tubular is described below with FIG. 4A.

Figure 4A:
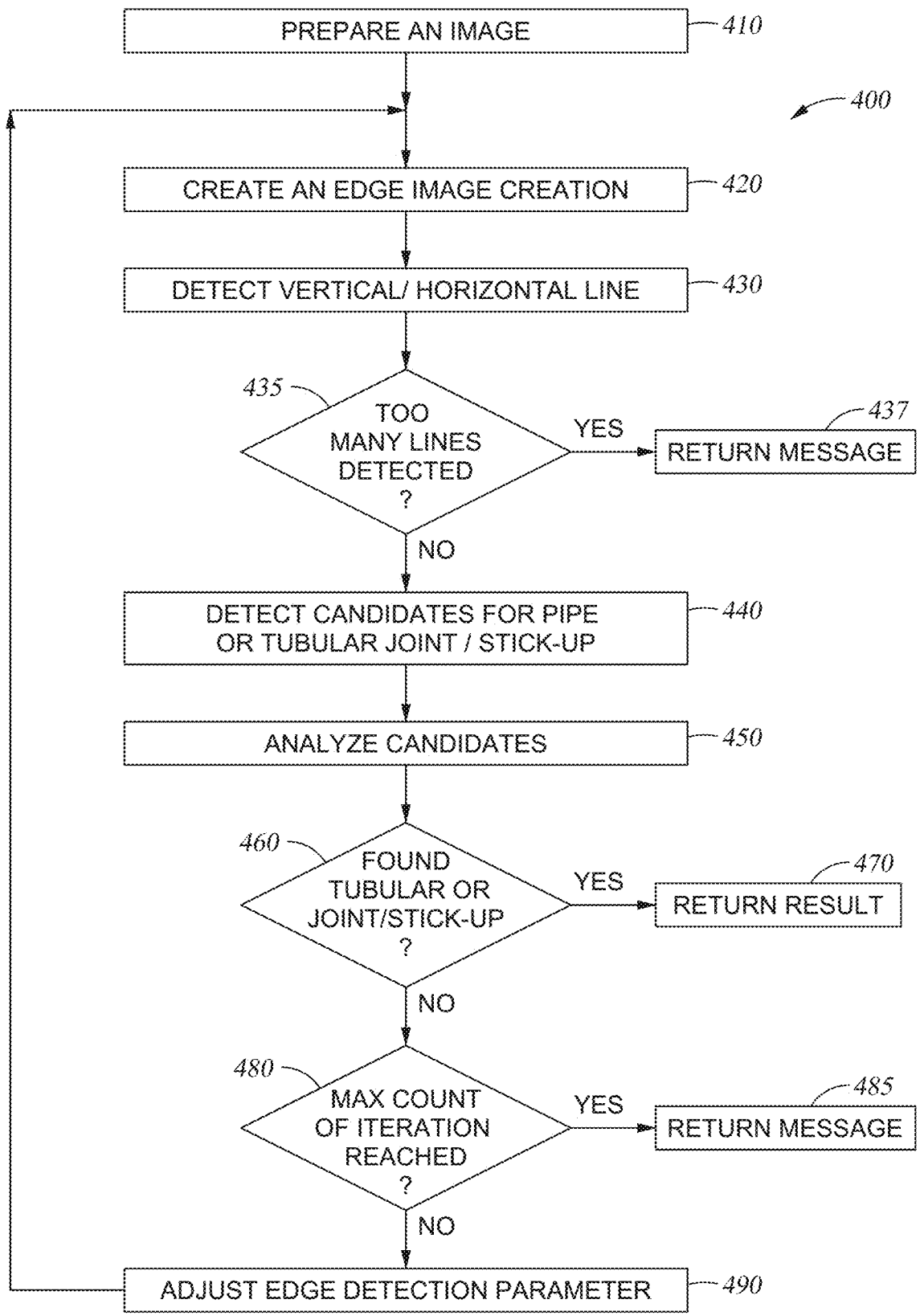
FIG. 4A is a flow chart of a method 400 for identifying a tubular or tubular joint/stick-up according to embodiments of the present disclosure.

FIG. 4A is a flow chart of a method 400 for identifying a tubular or tubular joint/stick-up according to embodiments of the present disclosure. The method 400 may be used to identify the tubular in operation 240 or to identify the tubular joint in operation 250.

In operation 410 of method 400, the 2D image is prepared for analysis. In some embodiments, the 2D image captured by the camera may be converted to a grayscale image if the original image is a color image. In some embodiments, the image may be filtered to remove noises or undesirable details. For example, a Gaussian blur filter may be applied to the image to remove local noises. In some embodiments, the image is cropped to select a region of interest. For example, the camera may have a horizontal field of view that is much wider than the tubular string to be analyzed; therefore, the original image may include a large background area on both sides of the tubular string. In operation 410, the original image may be first cropped to only a central region prior to any processing.

In operation 420, an edge creating algorithm may be applied to the prepared image to create an edge image. In some embodiments, an edge parameter may be selected to define an edge, and an edge point may be defined in the grayscale image when a difference between scales of neighboring pixels exceeds a threshold value associated with the edge parameter. The edge image may be a black and white image wherein a white pixel in the image represents an edge point and a black pixel in the image is not an edge point. Any suitable algorithms may be used for this operation. In some embodiments, Canny edge algorithm may be used to create the edge image.

In operation 430, the edge image is analyzed to detect vertical lines or horizontal lines depending on the task. When the task is to detect a tubular substantially running along a vertical direction of the image, the edge image is analyzed to detect parallel vertical lines that represent boundaries between the tubular and the background. When the task is to detect a tubular joint/stick-up on a vertical tubular, the edge image is analyzed to detect horizontal lines that represent the distinguishable feature of the tubular joint/stick-up. Any suitable algorithms may be used for this operation. In some embodiments, Houghline algorithm is used to detect the vertical or horizontal lines.

In some embodiments, the detected vertical and horizontal lines and are counted in an operation 435. If the number of detected lines is greater than a pre-set upper limit, an operation 437 is performed to return an error message. If the number detected lines is within the limit, operation 440 is performed.

In operation 440, the detected vertical or horizontal lines are sorted and merged to form various candidates for a tubular or a tubular joint/stick-up. Detection of parallel lines enables identification of tubular structures.

In operation 450, the various candidates are analyzed to detect a tubular or a tubular joint/stick-up. For example, parallel vertical lines that run substantially through the entire length of the image may be a tubular. A group of horizontal lines that are close to each other and run substantially across the entire width of the image may be a tubular joint/stick-up.

In some embodiments, Canny Edge funding method may be used. To find edges, each horizontal line in the image is checked to determine if there is an edge pixel. An edge pixel is a pixel at the position that the vertical lines cross with the horizontal lines. An edge distance between the edge pixels on the left side of the image center to edge pixels on the right side of the image center is calculated. The horizontal lines may be scanned sequentially. If edge pixels are found in a subsequent horizontal line and the edge distance between the edge pixels in the subsequent horizontal line is identical to the edge distance between the pixels in the previous horizontal line, the horizontal lines are merged together to form a segment. If edge pixels are found in a subsequent horizontal line and the edge distance between the edge pixels in the subsequent horizontal line is different from the edge distance between the pixels in the previous horizontal line, a new segment is formed starting with the subsequent horizontal line. When two segments with smaller distances are separated by a middle segment with a larger distance, the middle segment is identified as a tool joint connection box. In some embodiments, all segments are located close together. If no connection box is found, the canny edge algorithm parameters are changed to be more sensitive and the whole procedure is repeated.

In operation 460, a determination is made as whether a tubular or tubular joint/stick-up has been detected. When a tool joint connection box is found, a tubular or tubular joint/stick-up is detected.

If the answer is yes, the detected result, either a tubular or a tubular joint/stick-up is returned in operation 470.

If the answer is no, operation 480 is performed. In operation 480, a number of iteration for joint detection is reviewed and compared to a maximum count. If the number of iteration reaches the maximum count, an error message is returned in operation 485.

If the number of iteration is within the maximum count, edge detection parameter is adjusted in operation 490, and operations 420-460 are repeated with a different edge parameter until a tubular or a tubular joint/stick-up is detected.

Figure 4E:
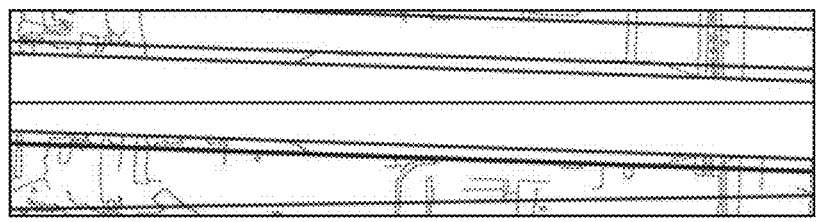
FIGS. 4B-4E schematically demonstrate an example of finding a tubular using the method of FIG. 4A.
Figure 4D:
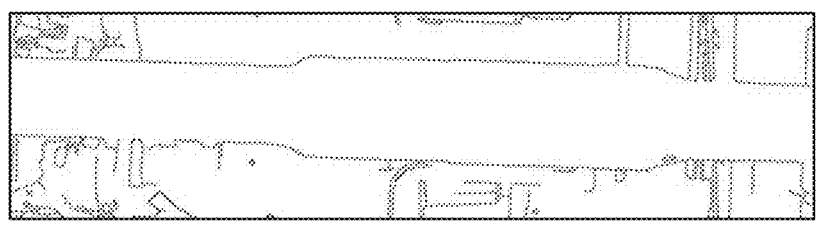
Figure 4C:
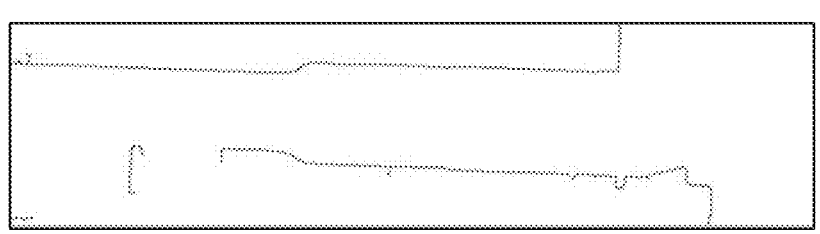
Figure 4B:

FIGS. 4B-4E schematically demonstrate an example of finding a tubular using the method of FIG. 4A. FIG. 4B includes an edge image resulted from a rough edge parameter in operation 420. The black and white image in FIG. 4B does not include any edge points. FIG. 4C includes an edge image resulted from a more sensitive edge parameter in operation 420 than the edge parameter used in FIG. 4B. The black and white image in FIG. 4C includes some edge points, but the edge points do not form any vertical lines that substantially run through the image length wise. FIG. 4D includes an edge image resulted from a more sensitive edge parameter in operation 420 than the edge parameter used in FIG. 4C. The black and white image in FIG. 4D includes edge points that form vertical lines that substantially run through the image length wise. In FIG. 4E, parallel lines representing a tubular are detected. The locations of the parallel lines in the image are returned for further analysis.

Figure 5A:
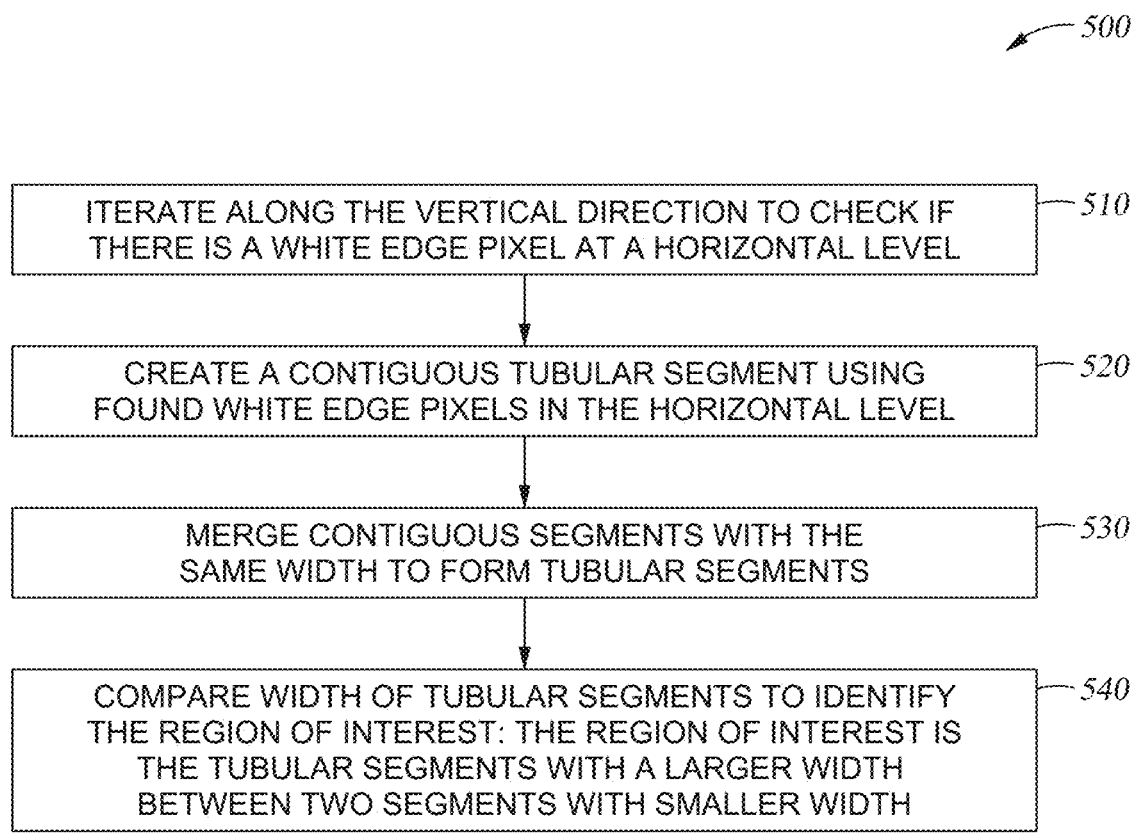
FIG. 5A is a flow chart of a method for identifying a region of interest according to embodiments of the present disclosure.
Figure 5D:
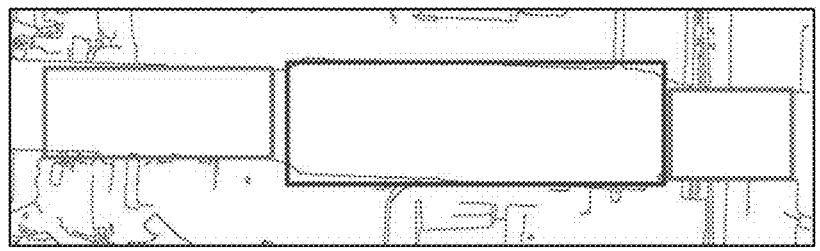
FIGS. 5B-5D schematically demonstrate an example of finding a tubular using the method of FIG. 5A.
Figure 5C:
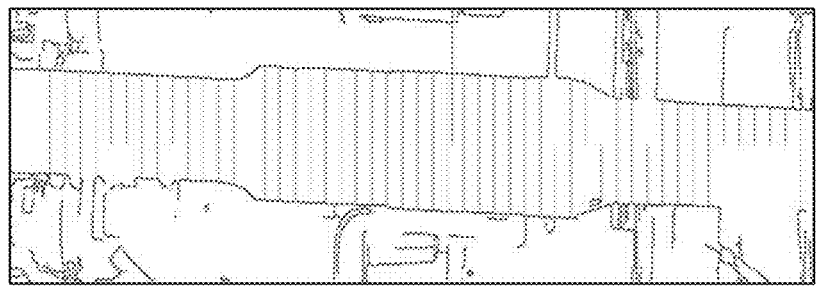
Figure 5B:
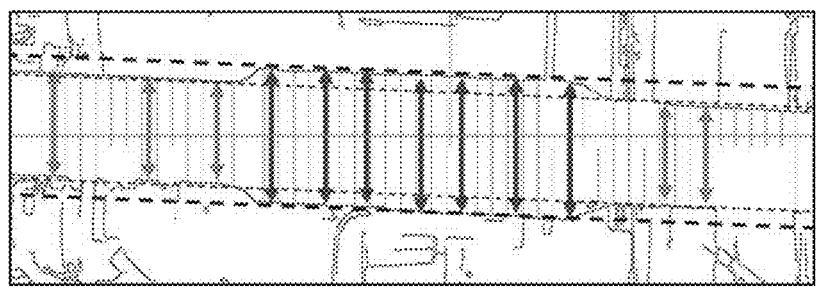

FIG. 5A is a flow chart of a method 500 for identifying a region of interest within a tubular segment according to embodiments of the present disclosure. The method 500 may be used operation 240 after the tubular is identified. FIGS. 5B-5D schematically demonstrate an example of finding a tubular using the method 500 of FIG. 5A.

In operation 510 of the method 500, the edge image where the tubular is detected is analyzed along the vertical direction to check if there are white pixels in a plurality of horizontal levels. For example, as shown in FIG. 5B, in each horizontal level, the edge image is analyzed from a center point to check if there is a white edge point at either direction. In some embodiments, the plurality of horizontal levels may be evenly distributed along the vertical direction.

In operation 520, a contiguous tubular segment is created using the found white points at the horizontal level. Operations 510 and 520 may be reiterated along the vertical direction. Resulting in the image in FIG. 5C.

In operation 530, contiguous segments of the same width are merged to form different tubular segments. As shown in FIG. 5E, three segments of different width are formed.

In operation 540, a region of interest is determined according to the width of the tubular segments. Because of the shoulder features in the tubulars, a tubular segment with a tubular joint has a larger diameter or width than the tubular segments without tubular joints. In some embodiments, the region of interest or a tubular segment including a tubular joint is the tubular segment with a larger width in the image being analyzed. As shown in FIG. 5E, the region of interest starts when there is a width increase and ends when there is width decrease.

Figure 6A:
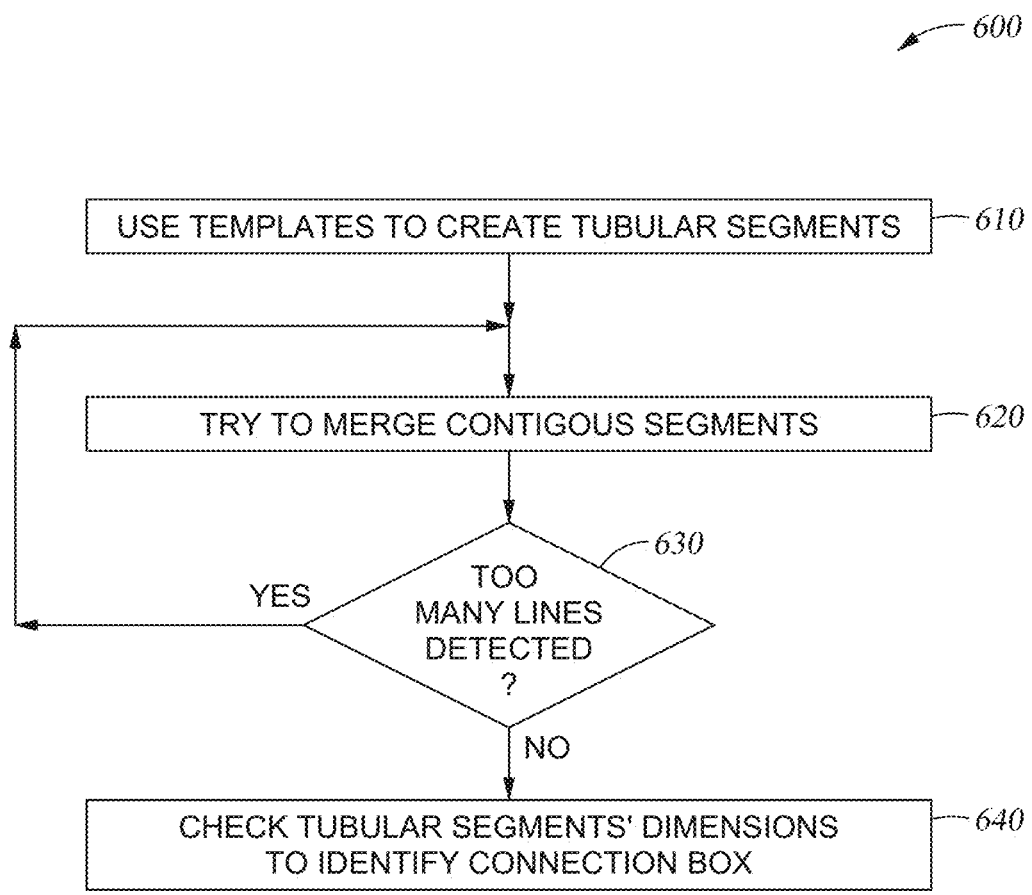
FIG. 6A is a flow chart of a method for identifying a region of interest according to embodiments of the present disclosure.
Figure 6D:
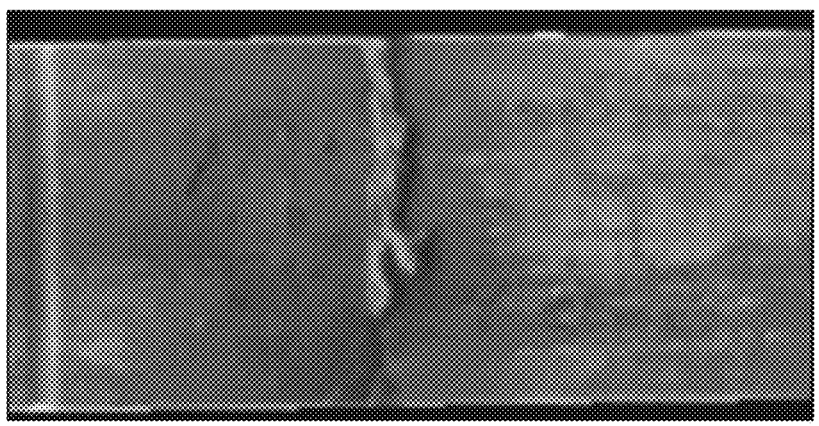
FIGS. 6B-6D schematically demonstrate an example of finding a tubular using the method of FIG. 6A.
Figure 6C:
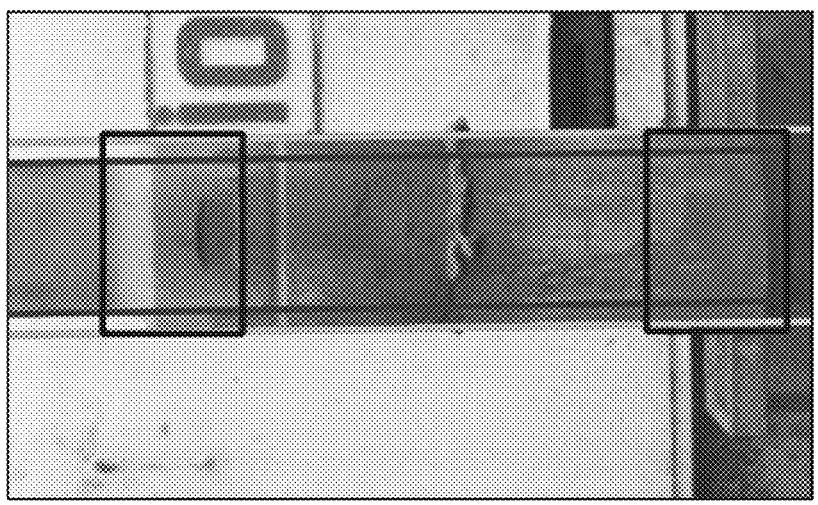
Figure 6B:
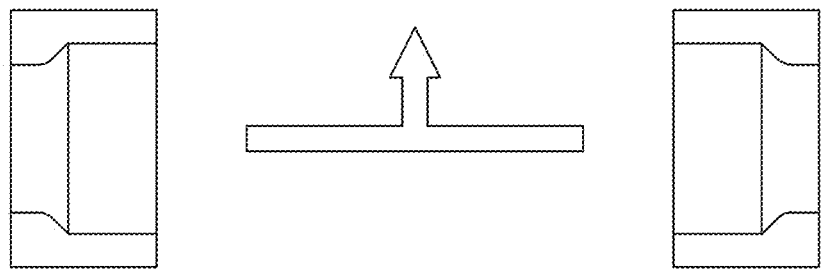

FIGS. 6A-6D demonstrate an alternative method for finding a region of interest. FIG. 6A is a flow chart of a method 600 for identifying a region of interest according to embodiments of the present disclosure. The method 600 may be used in operation 240 in place of the method 500 described above. FIGS. 6B-6D schematically demonstrate an example of finding a tubular using the method 600 of FIG. 6A.

In operation 610 of the method 600, templates representing shoulder features of a tubular are created. In some embodiments, templates are black and white images. FIG. 6B includes two templates representing the shoulder features of the tubular.

In operation 620, the templates are moved within the region of image having identified tubular to merge with the image. The templates merge with the image at the location including the features matching the features in the templates.

In operation 630, a determination is made as of whether the templates are merged with the image. If the answer is no, perform operation 620 again at a new location. If the answer is yes, operation 640 is performed to further reduce the region of interest. FIG. 6C demonstrates when the templates are merged into the image.

In operation 640, a region of interest is determined based on the locations of the merged templates. The region of interest corresponds to the tubular between the two templates. As shown in FIG. 6D, a region of interest is determined based on the locations of the merged templates.

Figure 7A:
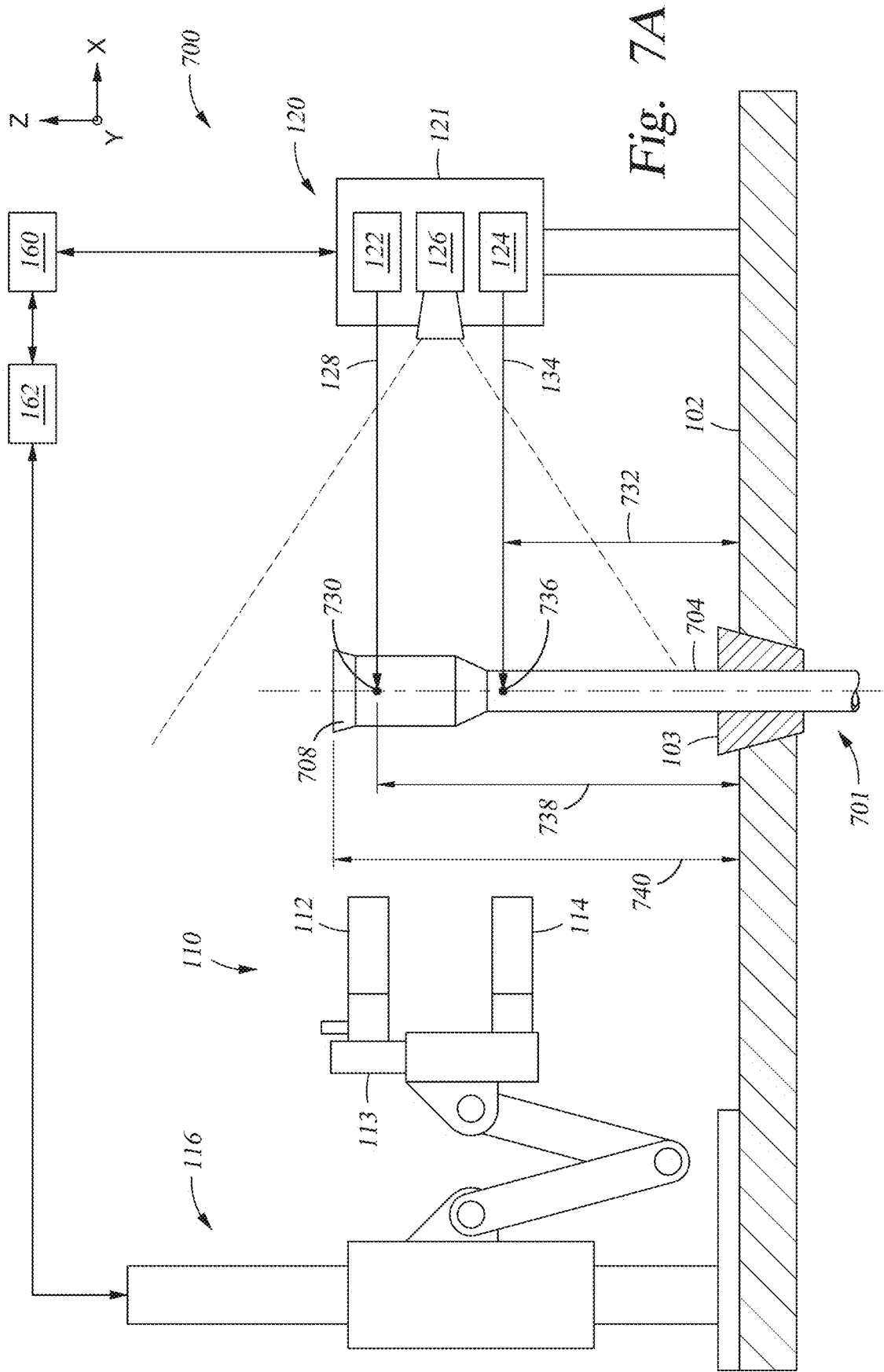
FIGS. 7A-7D schematically demonstrate aligning a tong assembly with a tubular for a makeup operation according to embodiments of the present disclosure.

FIGS. 7A-7D schematically demonstrate aligning the tong assembly 110 with a tubular for a makeup operation using the tubular handling system 100. In FIG. 7A, the imaging unit 120 captures images of the section of a tubular string 701. The tubular string 701 includes a top tubular 704 having a tubular stick-up 708.

In some embodiments, the controller 160 operates a computer program to align the tong assembly 110 with the tubular stick-up 708 prior to performing the makeup operation. In some embodiments, the imaging unit 120 takes two images of the tubular string 701: a first image is taken while the laser pointers 122, 124 are projecting marks 730, 736 onto the tubular string 701, and a second image is taken while the laser pointer 122, 124 are off. In some embodiments, heights 732, 738 of the laser marks 730, 736 are pre-set and known. By comparing the first and second images, for example using image processing program in the controller 160, positions of the marks 730, 736 in the images can be identified. In some embodiments, the first or second image is analyzed to identify the tubular stick-up 708 in the image. The location, including a height 740, of the tubular stick-up 708 is then determined using positions of the marks 730, 736 as reference. The location of the tubular stick-up 708 can be determined using methods 200, 400, 500 or 600 described above.

The marks 730, 736 are used as a ruler for measuring distances in a two dimensional images. Even though laser marks are described herein, other measurement references may be used, such as an object of a known dimension positioned at a known location.

Figure 7B:
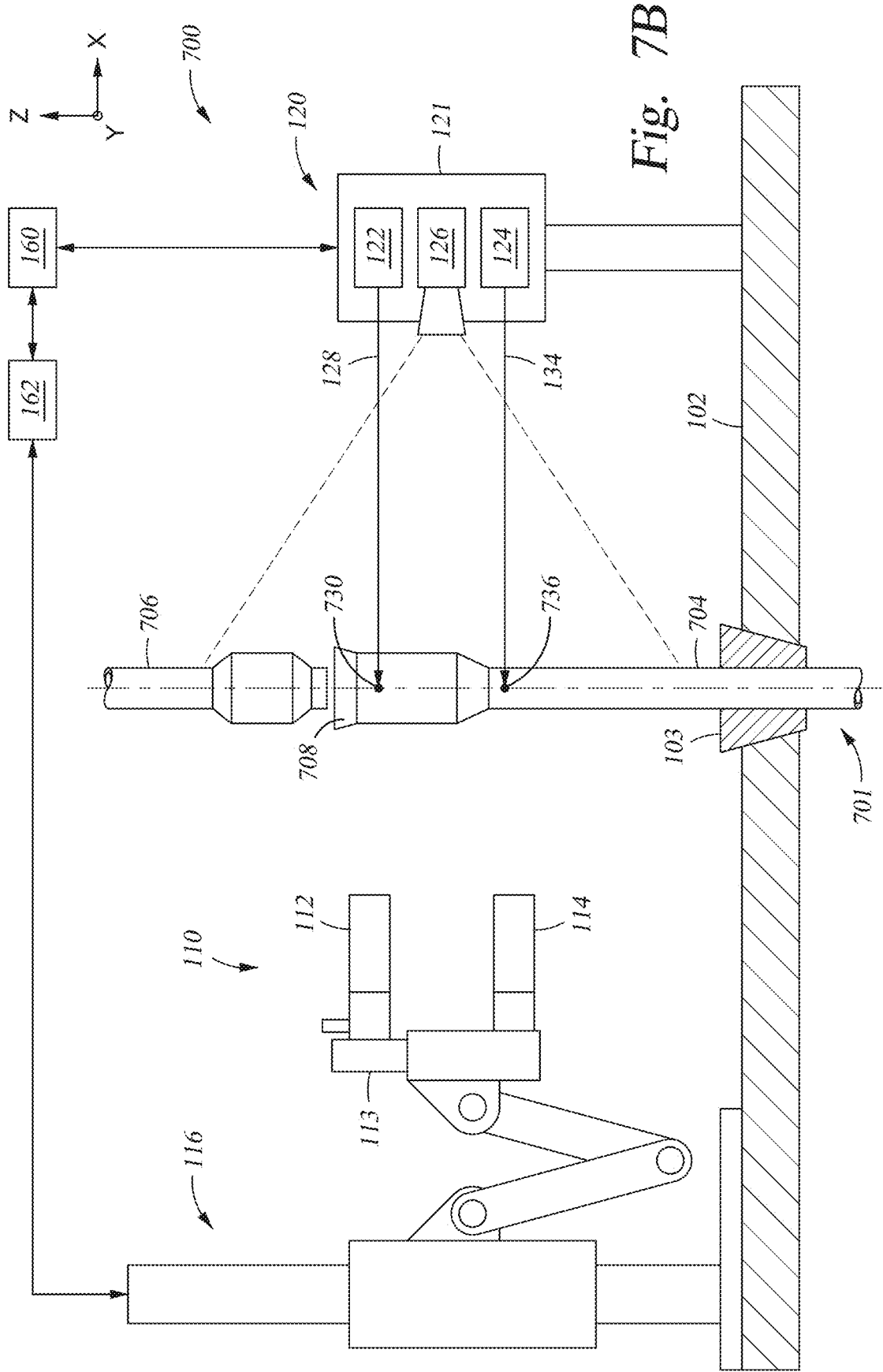

Upon determining the height 740 of the tubular stick-up 708, the controller 160 sends commands to the tong handler 116 to align the tong assembly 110 with the tubular stick-up 708 for a makeup operation. In FIG. 7B, a second tubular 706 is moved, for example using a top drive, over the tubular stick-up 708 to join with the top tubular 704. In some embodiments, the position of the second tubular 706 may be controlled according to the height 740 determined using embodiments of the present disclosure.

Figure 7C:
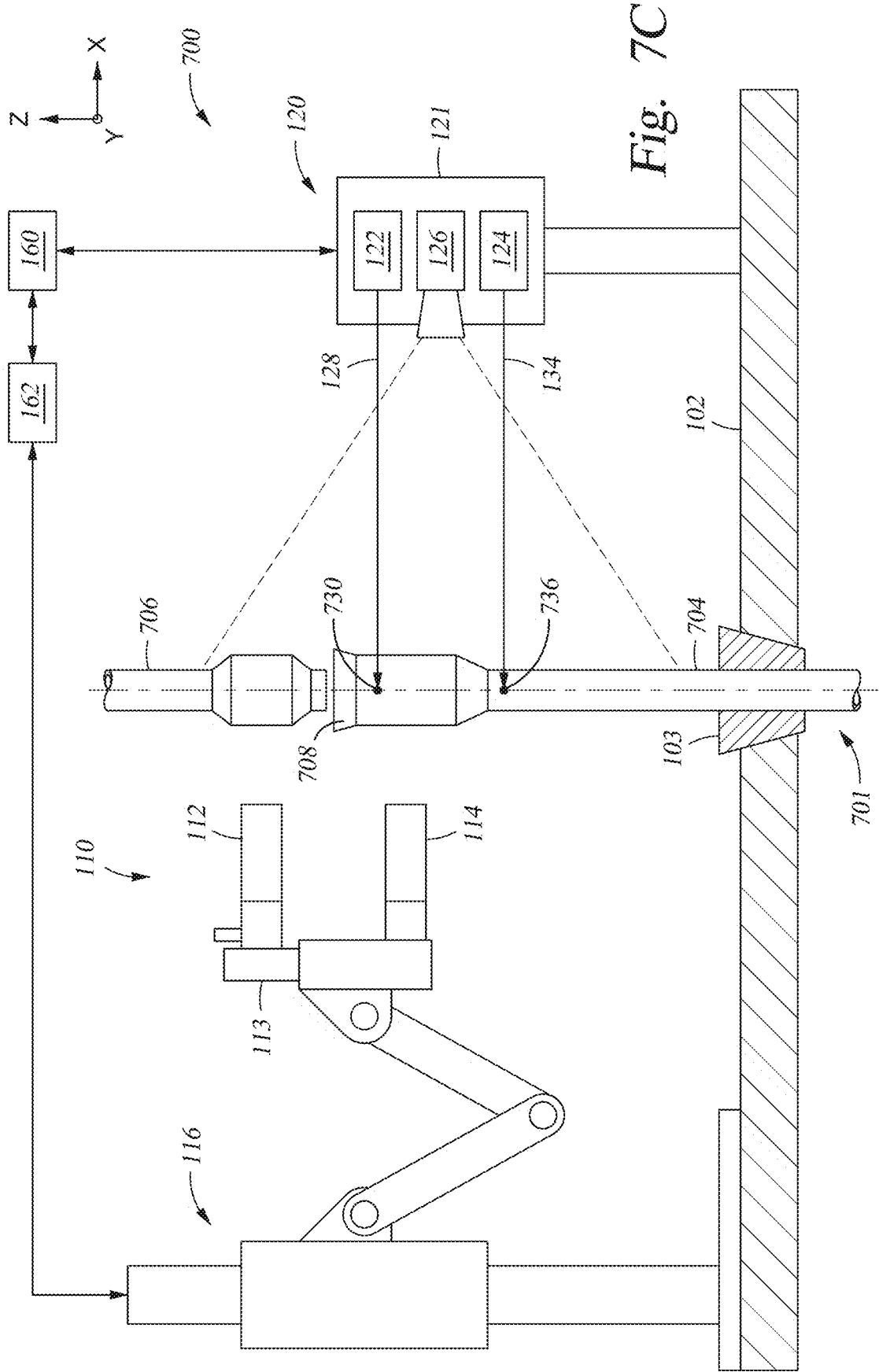
Figure 7D:
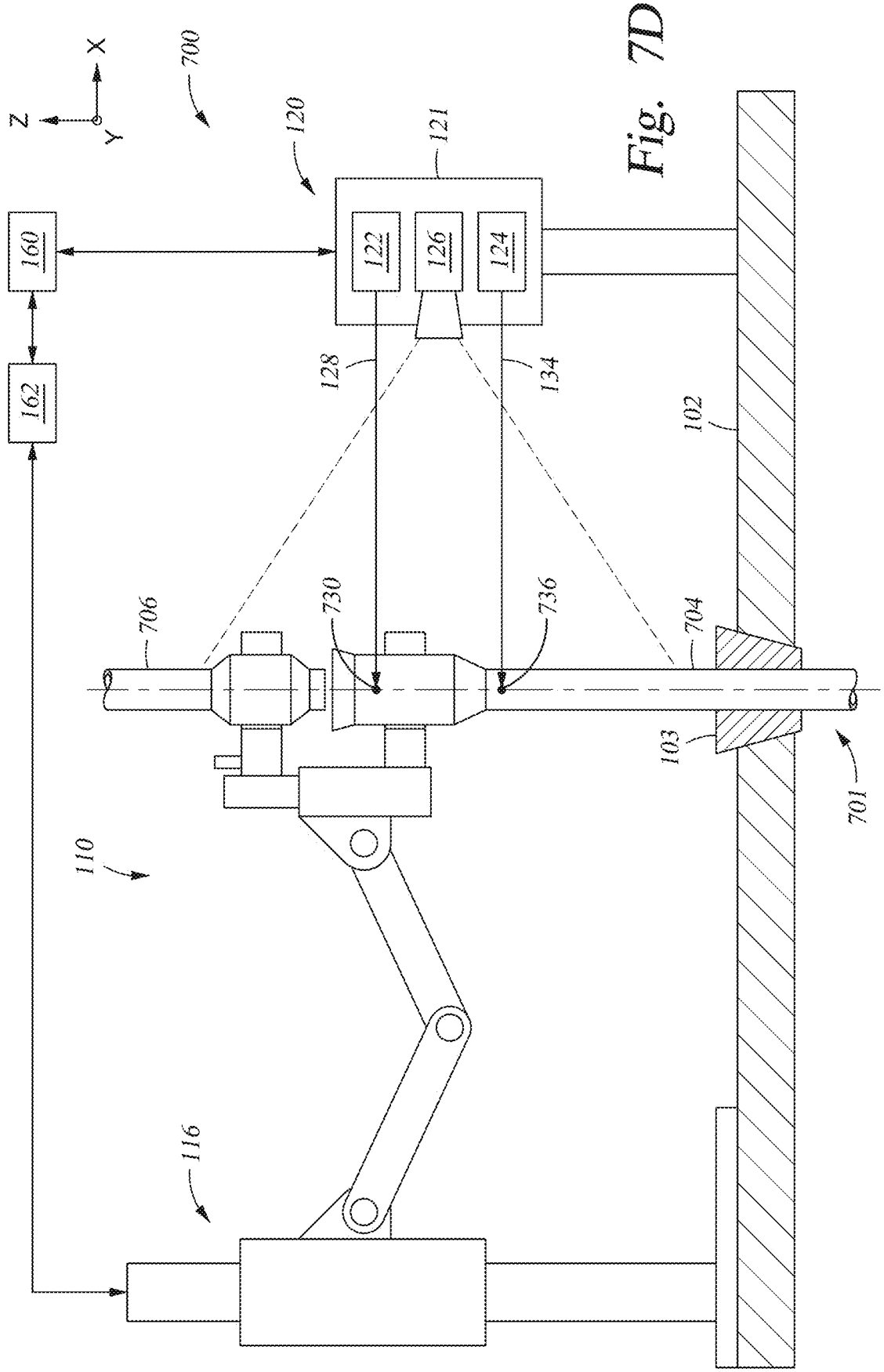

FIG. 7C schematically illustrates an intermediate step of aligning the tong assembly 110 with the tubular stick-up 708 to makeup a tubular joint between the tubulars 704, 706. The tong assembly 110 is positioned at a height to have the power tong 112 in position to grasp the tubular 706 and the backup tong 114 in position to grasp the tubular 704 below the tubular stick-up 708. FIG. 1D schematically illustrates that the tong assembly 110 grasping the tubulars 706, 704 to make up a tubular joint.

Figure 8:
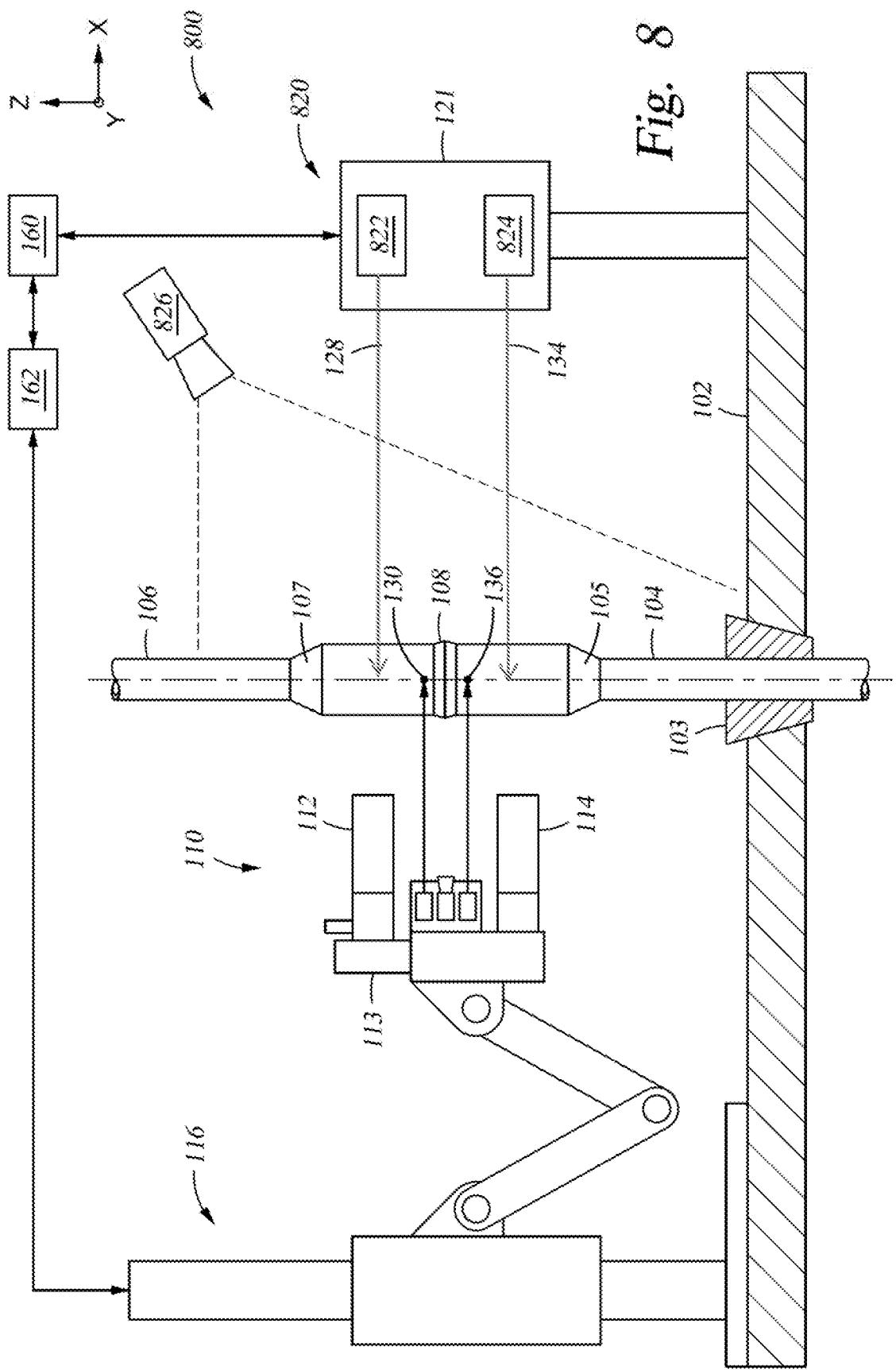
FIG. 8 is a schematic side view of a tubular handling system according to embodiments of the present disclosure.

FIG. 8 is a schematic side view of a tubular handling system 800 according to embodiments of the present disclosure. The tubular handling system 800 is similar to the tubular handling system 100 except the tubular handling system 800 includes an imaging unit 820 of different configuration. The imaging unit 820 includes a camera 826 and two laser pointers 822, 824. The camera 826 is located at a separate location from the laser pointers 822, 824. In some embodiments, the camera 826 may be an existing camera on the rig floor 102.

FIG. 9 is a schematic side view of a tubular handling system 900 according to embodiments of the present disclosure. The tubular handling system 900 is similar to the tubular handling system 100 except the tubular handling system 900 includes an imaging unit 920 that is attached to the tong assembly 110. The imaging unit 920 moves with the tong assembly 110.

In some embodiments, the tong assembly 110 may be maintained at a known location for the imaging unit 920 to capture images for tubular joint/stick-up identification. Upon location of the tubular joint/stick-up, the tong assembly 110 is moved to align with the tubular joint/stick-up for operation.

In some embodiments, the imaging unit 920 may include a video camera that is capable of capturing a video stream of the tubular string while the tong assembly 110 is in motion. The video stream is analyzed in real time to provide feedback to adjust movement of the tong assembly 110 during alignment.

Embodiments of the present disclosure provide a method for locating a tubular feature. In some embodiments, the method comprises capturing a first two dimensional image of a tubular, capturing a second two dimensional image of the tubular including a reference, identifying a tubular joint or stick-up of the tubular from the first or second two dimensional image, and determining a vertical position of the tubular joint or stick-up of the tubular using the reference.

In one or more embodiments, capturing the second dimensional image of the tubular comprises projecting two laser marks on to the tubular, and the reference includes the two laser marks.

In one or more embodiments, projecting two laser marks comprises projecting two laser marks at different locations along a longitudinal axis of the tubular.

In one or more embodiments, the method further comprises comparing the first and second images to detect locations of the two laser marks in the second image.

In one or more embodiments, identifying the tubular joint or stick-up comprises identifying the tubular by detecting parallel vertical lines in the first or second two dimensional image, selecting a region of interest in the first or second two dimensional image according to the identified tubular.

In one or more embodiments, identifying the tubular joint or stick-up further comprising identifying the tubular joint or stick-up by detecting horizontal lines in the region of interest.

In one or more embodiments, identifying the tubular joint or stick-up further comprises reducing the region of interest prior to identifying the tubular joint or stick-up.

In one or more embodiments, reducing the region of interest comprises identifying a shoulder feature in each tubular associated with the tubular joint or stick-up, and reducing the region of interest according to the identified shoulder feature(s).

In one or more embodiments, the method further comprises aligning a tong assembly with the tubular joint/stick-up according to the determined vertical position.

In one or more embodiments, each laser mark includes two or more colors.

Some embodiments of the present disclosure provide a method of locating a tubular joint. The method includes capturing a two dimensional image including a tubular segment wherein a first tubular is connected to a second tubular by a tubular joint, identifying edges of the tubular segment from the two dimensional image, identifying a first feature in the first tubular and a second feature in the second tubular; defining a region of interest in the two dimensional image, wherein the region of interest is defined between the edges of the tubular segment and between the first feature and the second feature, and identifying the tubular joint within the region of interest.

In one or more embodiments, identifying edges of the tubular segments comprise detecting parallel lines along an axis of the tubular segment.

In one or more embodiments, the method further comprises cropping the two dimensional image according to the identified edges of the tubular segment.

In one or more embodiments, identifying a first feature in the first tubular and a second feature in the second tubular comprises scanning the cropped image along a plurality of horizontal levels for edge points, creating a contiguous tubular segment using the edge points in each horizontal level, merging contiguous tubular segments having the same width to form tubular segments, and compare widths of the tubular segments for the first feature and the second feature.

In one or more embodiments, identifying a first feature in the first tubular and a second feature in the second tubular comprises creating templates for the first and second features, and moving the templates within the cropped image to merge the templates with the cropped image.

In one or more embodiments, the first feature of the first tubular is a shoulder feature in the first tubular and the second feature of the second tubular is a shoulder feature of the second tubular.

In one or more embodiments, the method further comprises projecting two laser marks at known locations on the tubular segments and capturing a second two dimensional image of the tubular segment with the laser marks, and determining an actual position of the tubular joint using the two laser marks as reference.

In one or more embodiments, identifying the tubular joint within the region of interest comprises detecting horizontal lines within the region of interest.

Embodiments of the present disclosure provide a system for locating a tubular joint on a rig floor. The system includes a first laser positioned to project a first marker onto a tubular structure, a second laser positioned to project a second marker onto the tubular structure, wherein a distance between the first marker and the second marker is known, a camera positioned to capture two dimensional images of the tubular structure of a region including the first and second markers, and a controller connected to the first laser, second laser, and the camera.

In one or more embodiments, the first laser, the second laser and the camera are fixedly positioned relative to the rig floor.

In one or more embodiments, the first laser, the second laser, and the camera are attached to a tong assembly positioned on the rig floor, and the controller is configured to move the tong assembly.

While the foregoing is directed to embodiments of the present disclosure, other and further embodiments of the disclosure may be devised without departing from the basic scope thereof, and the scope of the invention is determined by the claims that follow.

The invention claimed is:

1. A method for locating a tubular feature, comprising:
    capturing a first two dimensional image of a tubular;
    projecting two laser marks on to the tubular;
    capturing a second two dimensional image of the tubular including a reference, wherein the reference includes the two laser marks;
    identifying a tubular joint or stick-up of the tubular from the first or second two dimensional image; and
    determining a vertical position of the tubular joint or stick-up of the tubular using the reference.

2. The method of claim 1, wherein projecting two laser marks comprises:
    projecting two laser marks at different locations along a longitudinal axis of the tubular.

3. The method of claim 2, further comprising comparing the first and second images to detect locations of the two laser marks in the second image.

4. The method of claim 1, wherein identifying the tubular joint or stick-up comprises:
    identifying the tubular by detecting parallel vertical lines in the first or second two dimensional image; and
    selecting a region of interest in the first or second two dimensional image according to the identified tubular.

5. The method of claim 4, wherein identifying the tubular joint or stick-up further comprising:
    identifying the tubular joint or stick-up by detecting horizontal lines in the region of interest.

6. The method of claim 5, wherein identifying the tubular joint or stick-up further comprises reducing the region of interest prior to identifying the tubular joint or stick-up.

7. The method of claim 6, wherein reducing the region of interest comprises:
    identifying a shoulder feature in each tubular associated with the tubular joint or stick-up; and
    reducing the region of interest according to the identified shoulder feature(s).

8. The method of claim 1, further comprising aligning a tong assembly with the tubular joint or stick-up according to the determined vertical position.

9. The method of claim 1, wherein each laser mark includes two or more colors.

10. A method of locating a tubular joint, comprising:
    capturing a two dimensional image including a tubular segment wherein a first tubular is connected to a second tubular by a tubular joint;
    identifying edges of the tubular segment from the two dimensional image by detecting parallel lines along an axis of the tubular segment;
    identifying a first feature in the first tubular and a second feature in the second tubular;
    defining a region of interest in the two dimensional image, wherein the region of interest is defined between the edges of the tubular segment and between the first feature and the second feature; and
    identifying the tubular joint within the region of interest.

11. The method of claim 10, further comprising cropping the two dimensional image according to the identified edges of the tubular segment.

12. The method of claim 11, wherein identifying a first feature in the first tubular and a second feature in the second tubular comprises:
    scanning the cropped image along a plurality of horizontal levels for edge points;
    creating a contiguous tubular segment using the edge points in each horizontal level;
    merging contiguous tubular segments having the same width to form tubular segments; and
    compare widths of the tubular segments for the first feature and the second feature.

13. The method of claim 11, wherein identifying a first feature in the first tubular and a second feature in the second tubular comprises:
    creating templates for the first and second features; and
    moving the templates within the cropped image to merge the templates with the cropped image.

14. The method of claim 10, wherein the first feature of the first tubular is a shoulder feature in the first tubular and the second feature of the second tubular is a shoulder feature of the second tubular.

15. The method of claim 10, further comprising:
    projecting two laser marks at known locations on the tubular segment and capturing a second two dimensional image of the tubular segment with the laser marks; and
    determining an actual position of the tubular joint using the two laser marks as reference.

16. The method of claim 10, wherein identifying the tubular joint within the region of interest comprises detecting horizontal lines within the region of interest.

17. A system for locating a tubular joint on a rig floor, comprising:
    a first laser positioned to project a first marker onto a tubular structure;
    a second laser positioned to project a second marker onto the tubular structure, wherein a distance between the first marker and the second marker is known;
    a camera positioned to capture two dimensional images of the tubular structure of a region including the first and second markers; and
    a controller connected to the first laser, second laser, and the camera.

18. The system of claim 17, wherein the first laser, second laser and the camera are fixedly positioned relative to the rig floor.

19. The system of claim 18, wherein the controller is configured to compare a first two dimensional image of the tubular structure without any markers to a second two dimensional image of the tubular structure with the first and second markers to detect locations of the first and second markers in the second two dimensional image.

20. The system of claim 17, wherein the first laser, second laser, and the camera are attached to a tong assembly positioned on the rig floor, and the controller is configured to move the tong assembly.

21. A method for locating a tubular feature, comprising:
    capturing a first two dimensional image of a tubular;
    capturing a second two dimensional image of the tubular including a reference;
    identifying a tubular joint or stick-up of the tubular from the first or second two dimensional image by detecting parallel vertical lines in the first or second two dimensional image; and selecting a region of interest in the first or second two dimensional image according to the identified tubular; and determining a vertical position of the tubular joint or stick-up of the tubular using the reference.

22. The method of claim 21, wherein identifying the tubular joint or stick-up further comprising:

identifying the tubular joint or stick-up by detecting horizontal lines in the region of interest.

* * * * *